US007536604B2

(12) United States Patent
Kuehl et al.

(10) Patent No.: US 7,536,604 B2
(45) Date of Patent: May 19, 2009

(54) METHOD AND SYSTEM FOR RECONFIGURING FUNCTIONAL CAPABILITIES IN A DATA PROCESSING SYSTEM WITH DORMANT RESOURCES

(75) Inventors: Klaus-Juergen Kuehl, Stuttgart (DE); Carl Mayer, Bissingen (DE); Juergen Probst, Wildberg (DE)

(73) Assignee: International Business Machines Corporation, Armonk, NY (US)

( * ) Notice: Subject to any disclaimer, the term of this patent is extended or adjusted under 35 U.S.C. 154(b) by 342 days.

(21) Appl. No.: 11/375,485

(22) Filed: Mar. 14, 2006

(65) Prior Publication Data
US 2007/0011407 A1    Jan. 11, 2007

(30) Foreign Application Priority Data
Jul. 12, 2005    (EP)    ................................. 05106372

(51) Int. Cl.
*G06F 11/00*    (2006.01)
(52) U.S. Cl. ....................................................... 714/40
(58) Field of Classification Search ...................... 714/2, 714/3, 6, 11–14, 26, 31, 39, 40, 47
See application file for complete search history.

(56) References Cited

U.S. PATENT DOCUMENTS

| | | | | |
|---|---|---|---|---|
| 3,812,468 | A | * | 5/1974 | Wollum et al. .................. 714/4 |
| 4,564,900 | A | * | 1/1986 | Smitt .......................... 709/212 |
| 5,812,757 | A | * | 9/1998 | Okamoto et al. .............. 714/11 |
| 5,982,899 | A | | 11/1999 | Probst |
| 6,018,812 | A | * | 1/2000 | Deyst et al. .................. 714/724 |
| 6,550,020 | B1 | * | 4/2003 | Floyd et al. .................... 714/10 |
| 6,697,979 | B1 | | 2/2004 | Vorbach et al. |
| 6,769,072 | B1 | * | 7/2004 | Kawamura et al. ............. 714/5 |

(Continued)

FOREIGN PATENT DOCUMENTS

GB    2405006 A    2/2005

(Continued)

OTHER PUBLICATIONS

J. Probst et. al., Flexible Configuration and Concurrent Upgrade for the IBM eServer z900, IBM J. Res. & Dev., vol. 46, No. 4/5, 2002.

(Continued)

*Primary Examiner*—Nadeem Iqbal
(74) *Attorney, Agent, or Firm*—Michael R. Nichols; Casimer K. Salys (57) ABSTRACT

A method, a computer program product and a system for reconfiguring functional capabilities in a data processing system with dormant resources. Dormant resources of a data processing system are used to replace (360) the functional characteristics of a broken hardware unit in order to compensate the lost resources. If sufficient dormant resources are available to replace the functional capabilities of the broken hardware unit, the data processing system can be used without any degradation of its capabilities. Otherwise the degradation is reduced. The functional part of the broken hardware unit is fenced (340) from the system, but its configuration data is read (350) from its non-functional part. The enablement definition data contained in the configuration data is then analysed for missing resources. Available dormant resources are then enabled until all the lost resources are replaced or no more dormant resources are available for the replacement.

20 Claims, 3 Drawing Sheets

U.S. PATENT DOCUMENTS

| | | | |
|---|---|---|---|
| 6,931,568 B2 * | 8/2005 | Abbondanzio et al. | 714/11 |
| 2003/0120914 A1 | 6/2003 | Axnix et al. | |
| 2005/0268162 A1 * | 12/2005 | Milligan et al. | 714/7 |

FOREIGN PATENT DOCUMENTS

WO     WO2004/057477 A1     7/2004

OTHER PUBLICATIONS

F. Baitinger et. al., System Control Structure of the IBM eServer z900, IBM J. Res. & Dev., vol. 46, No. 4/5, 2002.

L. C. Alves et. al., RAS Design for the IBM eServer z900, IBM J. Res. & Dev., vol. 46, No. 4/5, 2002.

* cited by examiner

METHOD AND SYSTEM FOR RECONFIGURING FUNCTIONAL CAPABILITIES IN A DATA PROCESSING SYSTEM WITH DORMANT RESOURCES

BACKGROUND OF THE INVENTION

The present invention generally relates to configurable data processing systems. Particularly, the present invention relates to a method, a system, and a computer program product for reconfiguring functional capabilities in a data processing system with dormant resources.

A computer system may comprise multiple similar or identical hardware units providing the same type of resources, for example memory cards, multi-chip processor modules, input/output cards with multiple ports, etc. A hardware unit itself can be composed of multiple components; e.g. a processor book can be comprised of a multi-chip processor module and an amount of memory, where the multi-chip processor module contains a number of processors, and a computer system can contain more than one of these processor books. The hardware units are typically field-replaceable, which means they can be replaced by a field engineer at the customer location.

For various reasons, the hardware units may not be used to full physical capacity but by some firmware supported control mechanisms, the exploitation may be limited. For example, only 3 of 12 physical processors contained in a multi-chip processor module may be enabled for execution. The unused resources are called dormant resources. This has various advantages, e.g., that the capacity of a computer system can be changed dynamically based on performance or other needs.

Another advantage is granularity: Dormant resources allow offering a wide range of system configurations without the need to reflect every configuration physically. Multiple models, variations and capabilities of modern computers represent a wide variety of choices to the consumer; the concomitant requirement that multiple variations and models of such computers be manufactured and stocked would represent a substantial burden to computer manufacturers.

For example, it is too expensive to build a specific multi-chip processor configuration for every number of processors that can potentially be used. Each existing model, variable functional characteristic or capability of a computer system represents a large number of different systems, subassemblies and components, which must be manufactured and stocked to maintain customer satisfaction.

The International Patent Application PCT/EP03/13073 teaches a method and system for alternatively activating a replaceable hardware unit in a data processing system. Initially a replaceable hardware unit is added to the data processing system, and then its type is determined. If the replaceable hardware unit is of a first type, a subset of its functional capabilities to be electronically enabled is determined. Alternatively, if the replaceable hardware unit is of another type, the entire functional capabilities of the replaceable hardware unit are enabled. The method allows solving compatibility issues for hardware units when they are used in very different models or configurations of a data processing system. For models or configurations that do not all allow to use the entire set of capabilities of a hardware unit, a subset of the functional capabilities is enabled only.

The U.S. patent application 2003/0120914A1 describes a method and system for flexible temporary capacity upgrade/downgrade in a computer system without the involvement of the operating system. Dormant resources are used to upgrade the capacity of the computer system. Capacity is downgraded by disabling used resources, which then become dormant resources. The usage of this method for the IBM® eServer® z900 is described in J. Probst et. al.: "Flexible configuration and concurrent upgrade for the IBM eServer z900", IBM J. Res. & Dev., Vol. 46, No. 4/5, 2002.

Both state of the art methods use the vital product data (VPD) of a computer system that among other things describes the separate hardware units contained in the computer system. Especially, the VPD describes if a hardware unit is used or not, hence if it is a dormant resource or not. This subset of the VPD is called enablement definition data. Typically, the system VPD is composed of the VPD of its various hardware units. The VPD including the enablement definition data of a hardware unit is stored in a device that is part of the respective hardware unit, e.g. in a serial electrically erasable programmable read only memory (SEEPROM) or in a smart chip.

In order to ensure the integrity of the VPD, especially the enablement definition data, and to prevent against tampering and misuse, secure protection mechanisms store an encrypted version of the enablement definition data in the hardware unit. The encrypted version of the enablement definition data is then decrypted by the system firmware when it is read from the hardware unit. The U.S. Pat. No. 5,982,899 describes such a mechanism. It uses an intrinsic and unchangeable identifier incorporated in a chip on each hardware unit and a non-symmetric encryption method with a private/public key pair to prevent counterfeiting and protect the VPD against misuse.

The unchangeable identifier is specific to that certain chip. Such an identifier is typically based on the electronic chip identifier provided as a standard service by modern CMOS fabrication technology. The identifier is used to encode the VPD. This encoding links the VPD to the specific hardware unit and prevents the cloning of the VPD of other samples of the same hardware unit. To prevent manipulation, the encoded VPD is encrypted with a private key known only to the restricted manufacturing process of the hardware unit.

The system VPD is aggregated by the system firmware during the system power-on phase by collecting all the VPD from its various hardware units. It is possible that the system VPD is managed and stored with the help and/or on a separate service processor or service console. Based on the enablement definition data in the system VPD, the available hardware capacity of the computer system is determined.

The enablement definition data of a hardware unit can also be overwritten in the system VPD. It is possible to associate an expiration date to the enablement definition data that is used to overwrite the enablement definition data of a hardware unit in the system VPD. This allows temporary upgrades of the computer system, which are revoked when the expiration date is reached.

During system runtime the VPD is updated by the system firmware whenever a new hardware unit is logically added to the system or logically removed from the system. However, a hardware unit is not logically removed from a system during its normal operation phase, when it is detected by some means that it is broken. It is only logically removed by a special remove operation that is usually triggered separately by a system operator. When it is logically removed, then it will usually also be physically removed from the system. On the other hand, a hardware unit can be logically added to a system (in a special add operation) only, when it was physically added to the system before.

If a broken hardware unit is detected, then the entire broken hardware unit is disabled and fenced from the system by the system firmware. A hardware unit that is physically removed from the system without triggering a remove operation appears to the system as a broken hardware unit.

If a broken hardware unit is detected during the system power-on phase, then the enablement definition data of the broken hardware unit is not read and the available capacity of the system is determined according to the enablement definition data of the remaining hardware units only. This is a big difference to the case when the hardware unit breaks at system runtime because then the system VPD is completely built up already.

Until now it was not recognized that dormant resources introduced to simplify system configuration can also be used to compensate system degradation due to a broken hardware unit. Even if sufficient dormant resources would be available during the system power-on phase to replace the enabled resources of the broken hardware unit, current data processing systems will not use them and will not provide the same capacity as if the hardware unit would not be broken. Nor will current systems reduce the degradation of their capabilities when not enough dormant resources are available.

SUMMARY OF THE INVENTION

It is therefore an object of the present invention, to provide a method for reconfiguring functional capabilities in a data processing system with dormant resources that is improved over the prior art and a corresponding computer system and a computer program product.

This object is achieved by the invention as defined in the independent claims. Further advantageous embodiments of the present invention are described in the dependent claims and are taught in the following description.

According to the present invention dormant resources of a data processing system are used to replace the functional characteristics of a broken hardware unit in order to compensate the lost resources. This allows postponing the replacement of the broken hardware to a later date while the data processing system can still be used with its full capabilities or with a reduced degradation.

In one embodiment, when a broken hardware unit is detected during the power-on phase of a computer system, the system firmware replaces the functional capabilities of that broken hardware by functional capabilities provided by dormant resources. If a sufficient amount of the required dormant resources is available to replace the functional capabilities of the broken hardware unit, the computer system can be used without any degradation of its capabilities until a physical replacement of the broken hardware unit was performed. Otherwise the degradation of its capabilities is reduced compared to the state of the art.

The advantages of the invention are achieved by the following steps: The functional part of the broken hardware unit is fenced from the data processing system, but the VPD of the broken hardware unit is read from its non-functional part. The enablement definition data of the broken hardware unit contained in its VPD is then analysed for missing resources due to the fencing of the broken hardware unit. In an allocation step available dormant resources are then enabled until all the lost resources are replaced or no more dormant resources are available for the replacement. When the broken hardware unit is replaced later, the resources of the replacement part are enabled based on the resource compensation by dormant resources.

In one embodiment of the invention the VPD of the broken hardware unit is stored in a non-volatile memory (e.g. an SEEPROM or a smart chip) in the non-functional part of the broken hardware unit, and the VPD is encoded with an unchangeable unique chip identifier of a chip in the functional part. Since this chip is no more accessible when the functional part is fenced from the system, a plain or encrypted copy of the identifier is held in a second non-volatile memory in the non-functional part.

To prevent misuse by cloning of the identifier to the second non-volatile memory the VPD may be used for a limited amount of time after the hardware unit was detected to be broken the first time and after verification that the respective broken part is still plugged in system. The limited amount of time can be the regular service cycle for the data processing system, e.g. one week. During service a physical replacement of the defective hardware unit can be done.

BRIEF DESCRIPTION OF THE DRAWINGS

The present invention and its advantages are now described in conjunction with the accompanying drawings.

DETAILED DESCRIPTION

Figure 1:
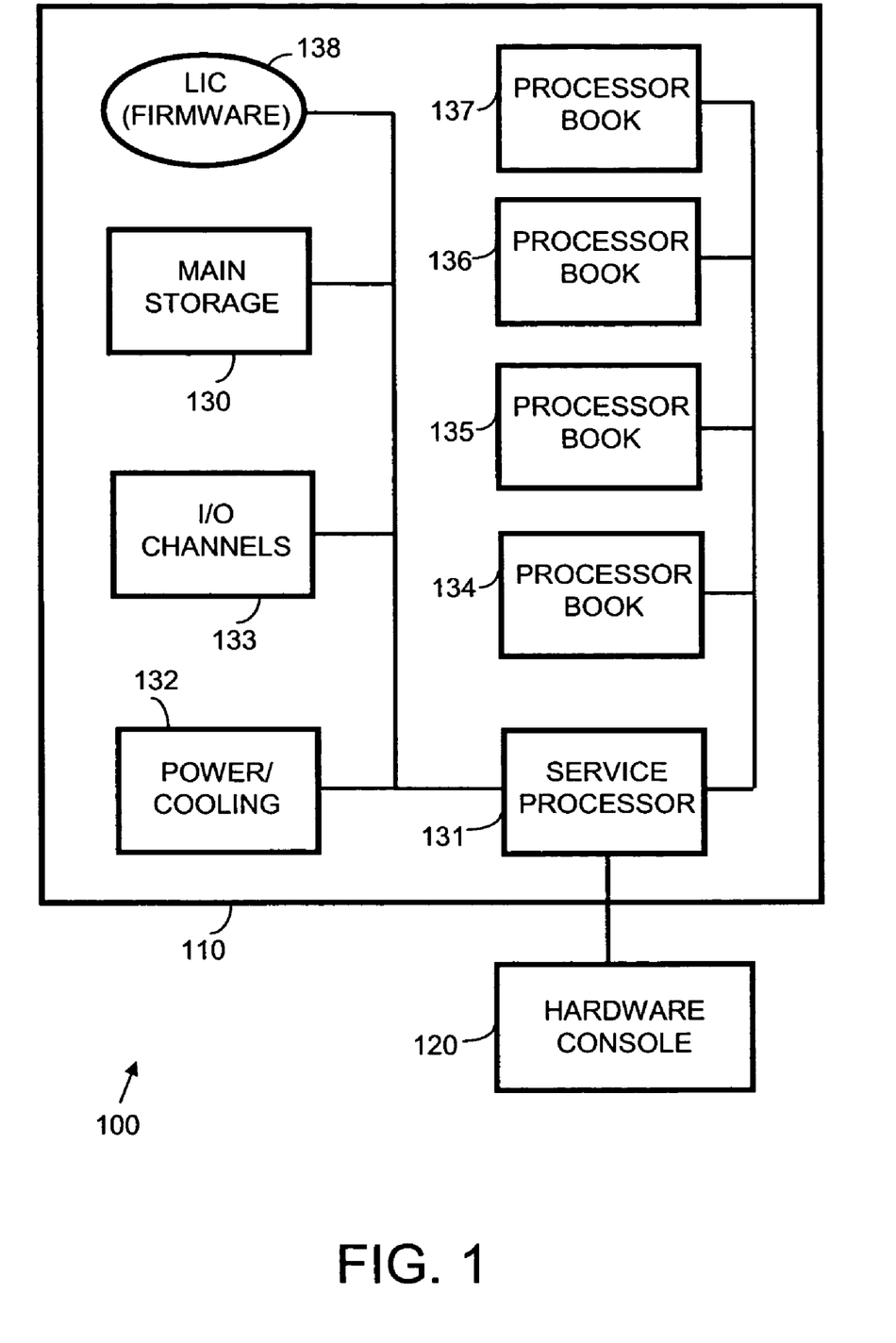
FIG. 1: Is a schematic block diagram of the hardware units in a data processing system, which may be used to implement the method of the present invention.

FIG. 1 shows a hardware configuration 100 in which the present invention may be implemented, e.g., an IBM zSeries 990 enterprise server. The hardware configuration includes a computer 110 and a hardware console 120. The computer 110 comprises a main storage 130, a service processor 131, a power supply and cooling device 132, I/O (input/output) channels 133, four processor books 134, 135, 136, 137 comprising one or more processors and cache memory each, and a LIC module (Licensed Internal Code, also called system firmware) 138.

As shown in FIG. 1, the hardware console 120 is connected to a service processor 131, which is part of the computer 110. The connection between the service processor 131 and the hardware console 120 may be realized by a commercial communication link as known in the art, e.g. Ethernet. The service processor 131 provides the hardware console 120 access to the functions and circuitry within the computer 110. Especially, the service processor 131 provides access to the hardware units 130, 132, 133, 134, 135, 136, 137, 138.

The service processor 131 can be implemented as a separate computer system embedded in the computer 110, including its own main storage and other storage devices such as flash memory, ROM (Read-Only Memory), and SEEPROMs. Then the embedded system 131 controls the computer 110. The processor architecture of the service processor 131 can be completely different from the architecture of the processors of the computer 110. The software executed by the service processor can be part of the LIC 138 or it can also be stored on one of its storage device, and received and/or updated from the system console 120.

A redundant implementation of a (master) service processor (and its slave) and the access to the hardware units are described in F. Baitinger et. al.: "System control structure of the IBM eServer z900", IBM J. Res. & Dev., Vol. 46, No. 4/5, 2002. The service processors are extended by a redundant service element that serves as a proxy to the system console 120 and provides a direct user interface for a system administrator. Also the service element and the system console 120 can be implemented as a computer system, where the system console 120 is a stand-alone computer and the service element is embedded in the computer 110.

It is acknowledged that the power supply and cooling device 132 can be implemented as separate devices. The device 132 is part of the infrastructure that allows the computer 110 to operate. The I/O channels 133 may be formed by one or more I/O adapters as generally provided and known in the art. Further, the I/O channels 133 may be connected to disks, tapes, terminals, LANs (Local Area Networks), printers or other I/O devices or I/O subsystems.

The LIC module 138 may run as system firmware on one or more of the processors in the processor books 134, 135, 136, 137 for internal purposes, e.g., to communicate with the hardware console 120 or to implement complex instructions, such as STSI (Store System Information).

In terms of resources the hardware configuration 100 provides processor capacity, storage, and I/O paths. The overall processor capacity is mainly determined by the number of processors, the performance of a single processor, cache size and cache access efficiency. The main storage 130 provides memory for storing the instructions (programs) and the data.

The processor books 134, 135, 136, 137 are implemented as field-replaceable hardware units that are plugged in the computer 110, and that comprise their VPD. The system VPD is aggregated from the VPD of all the hardware units.

Figure 2:
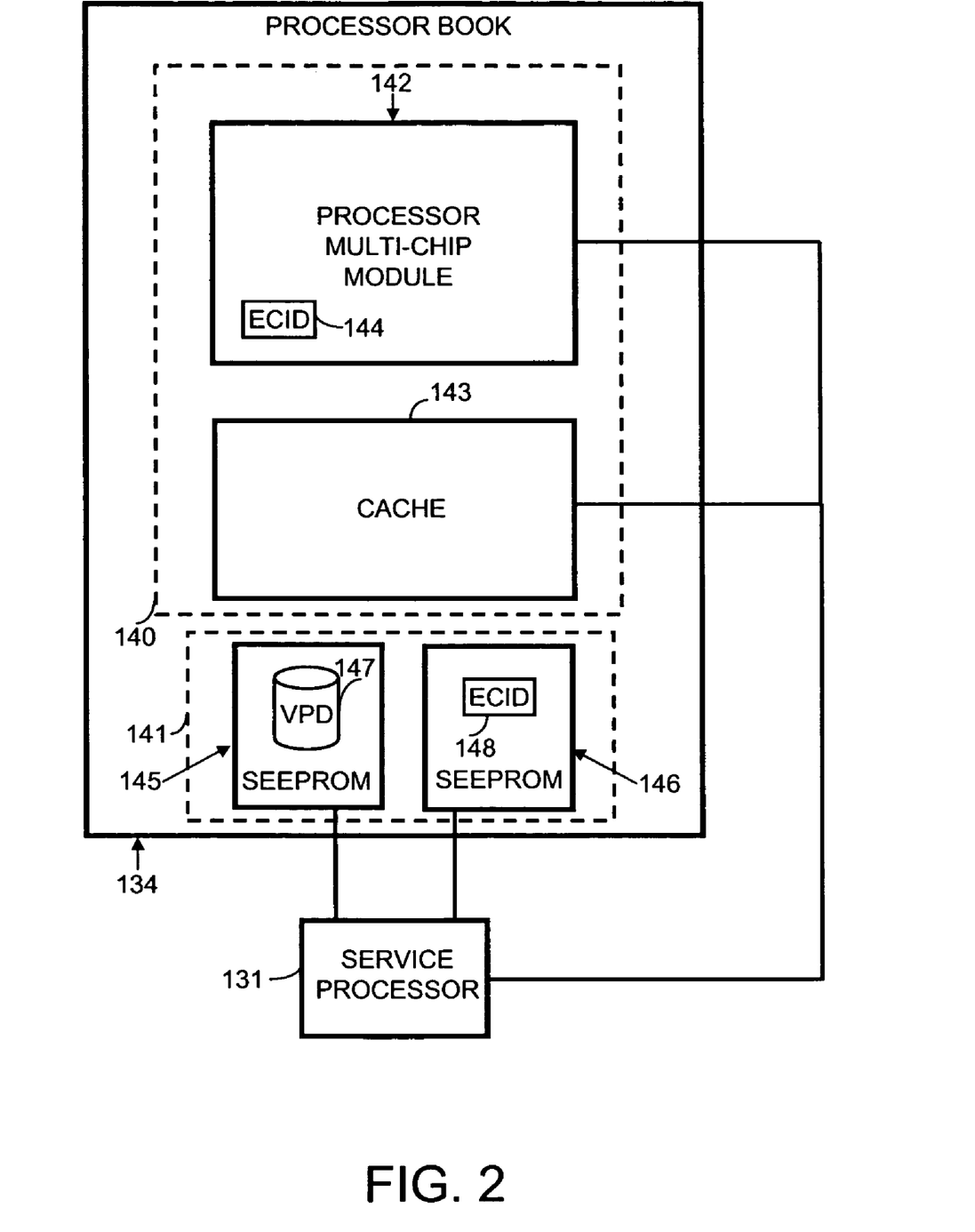
FIG. 2: Is a schematic block diagram of a hardware unit in accordance to the present invention.

FIG. 2 shows a possible implementation of a processor book 134 in accordance with the present invention. The processor book 134 is comprised of a functional part 140, and a non-functional part 141. The functional part 140 contributes to the capabilities of the computer 110. The non-functional part belongs to the infrastructure that allows the computer 110 to operate; especially it is part of the so-called system control structure.

The functional part 140 comprises a processor multi-chip module (MCM) 142, which contains two or more processors, and cache memory 143. Both the MCM 142 and the cache 143 can be accessed by the service processor 131. One of the chips in the MCM contains an unchangeable ECID (Engineering Chip IDentifier) 144, which was generated during the production of that chip. The ECID 144 is unique to that particular chip. Other chips on the same or on a different MCM have a different ECID.

At least one of the processors contained in the MCM 142 has to be reserved for the exclusive execution of the LIC 138. Such a reserved processor is called SAP (System Assist Processor) and used to improve the overall I/O performance of the computer 110 by handling all the I/O requests from the other processors in the system firmware that it executes. A processor that is not a SAP is called CP (Central Processing unit).

The non-functional part 141 of the processor book 134 comprises a first SEEPROM 145. In one embodiment of the invention the non-functional part 141 comprises a second SEEPROM 146 also. Instead of SEEPROMs also a smart chip can be used as a non-volatile memory for example. The first SEEPROM 145 and the second SEEPROM 146 are accessible by the service processor 131, e.g., via a standard inter-integrated circuit (I2C) bus.

The first SEEPROM contains the VPD 147 of the processor book 134. The VPD 147 was created and stored in the SEEPROM 145 during the manufacturing of the processor book 134. The VPD 147 can be stored in an encrypted form. In the preferred embodiment of the invention the VPD 147 was encoded with the ECID 144 and encrypted with a secret key known to the manufacturing process only. In that case the service processor 131 is able to decrypt the VPD 147 using a public key and to decode the VPD 147 by using the ECID 144.

Since the integrity of the ECID 144 can no more be guaranteed and the ECID 144 can potentially be no more accessed by the service processor 131 when the functional part 140 is broken, a copy 148 of the ECID 144 is stored in plain or encrypted form in the second SEEPROM 146 during manufacturing. The probability that the non-functional part 141 breaks can be neglected compared to the probability that the functional part 140 breaks.

The increased exposure to cloning the copy 148 of the ECID 144 and to cloning the VPD 147 can be compensated by an encrypted time stamp that is added to the second SEEPROM 146 by the service processor 131 when it detects the first time that the functional part 140 of the processor book is broken, and optionally by verifying if the respective broken part is still plugged in the computer 110. The time stamp is used to determine an expiration time until when the VPD 147 is treated as invalid by the service processor 131. The expiration time can be the regular service cycle time (e.g. one week), such that it can be guaranteed that the broken hardware unit 134 can be replaced until the expiration time is reached. After the expiration time the service processor 131 will remove the VPD 147 from the system VPD, and it will not use the VPD 147 when the system VPD will be build.

The operation of the computer 110 can be divided in three phases: power-on, normal operation, and (optionally) power-off. In the power-on phase all the hardware and system firmware is initialised and started up to the point where the computer system operates as defined in its architecture. During the subsequent normal operation phase operating systems are started (booted), executed and terminated on the computer 110. In the final power-off phase the hardware and firmware is prepared such that it is safe to disconnect the computer system afterwards from the power network. The start of the power-on phase is also called power-on reset as all the volatile state information in the computer 110 is (or can be) lost even when the computer 110 was not disconnected from the power network since the last normal operation phase.

During the power-on phase the service processor 131 initialises the hardware units to a predetermined state depending on their physical location in the computer 110. Especially, it initialises all the chips in the MCM 142 of the processor book 134 by scanning start-up patterns into the chained-up latches using JTAG (Joint Test Association Group, IEEE 1149.1 boundary scan standard) or other shift interfaces. Afterwards it tests the chips in the MCM 142 and the cache 143 for their correct behaviour by initiating and controlling built-in self tests (BISTs) of the chips using the JTAG interface.

If one of the BISTs fails (for example when the controller of the cache memory 143 is broken), then the entire processor book 134 is marked as defect and fenced from the computer 110: If possible, the processor book 134 is brought to a defined state such that it is isolated from the computer 110 and can not influence its behaviour. In most cases only one of the many components of the processor book 134 has a minor defect, and the fencing of the processor book 134 will work without a problem.

In accordance to the invention only the functional part 140 is fenced, whereas the non-functional part 141 still remains in use by the service processor 131. For other hardware units other special tests are used to verify their correct behaviour; see for example L. C. Alves et. al.: "RAS design of the IBM eServer z900", IBM J. Res. & Dev., Vol. 46, No. 4/5, 2002. The initialising and testing of the different hardware units can be done in parallel.

After the service processor 131 has initialised and tested a hardware unit, it reads its VPD and stores it in the main storage 130. If a hardware unit was fenced, its VPD can still be read from the non-functional part as it is not fenced. The copy of the VPD of a broken hardware unit will then be marked as broken in the main storage 130. Once all the hardware units are initialised and the broken hardware units are fenced from the computer 110, the copies of the VPDs of the various hardware units in the main storage 130 are combined into the system VPD, which is also stored in the main storage 130.

Especially, the system VPD contains the enablement definition data for every hardware unit. For the processor book 134, the enablement definition data defines the number of processors of the MCM 142 that are SAPs, the number of processors of the MCM 142 that are CPs, and the number of processors of the MCM 142 that are spare processors. A spare processor is a dormant resource that will be not enabled. The cache 143 can be used by the processors of the MCM 142 only and cannot be enabled or disabled via the enablement definition data.

When the system VPD was built in the main storage 130, the service processor 131 replaces missing resources of the broken hardware unit in the system VPD: For every enabled resource of a broken hardware unit an equivalent dormant resource is enabled if available. For example, for a processor marked enabled in the VPD of the processor book 134 another processor from one of the processor books 135, 136, 137 that is marked as dormant in the system VPD is changed enabled in the system VPD.

When the replacement step for the missing resources is complete, the service processor 131 loads the LIC 138 to all the available CPs and SAPs and starts the system firmware. This step is usually called IML (Initial Microcode Load). When the IML has finished, the normal operation phase of the computer 110 begins. A subsequent step of loading and starting an operating system is called IPL (Initial Program Load). During IML the system firmware uses the enablement definition data in the system VPD in the main storage 130 to determine which resources have to be enabled and which have to remain unused as dormant resources. Only the enabled resources can be made available by the system firmware for an operating system.

Figure 3:
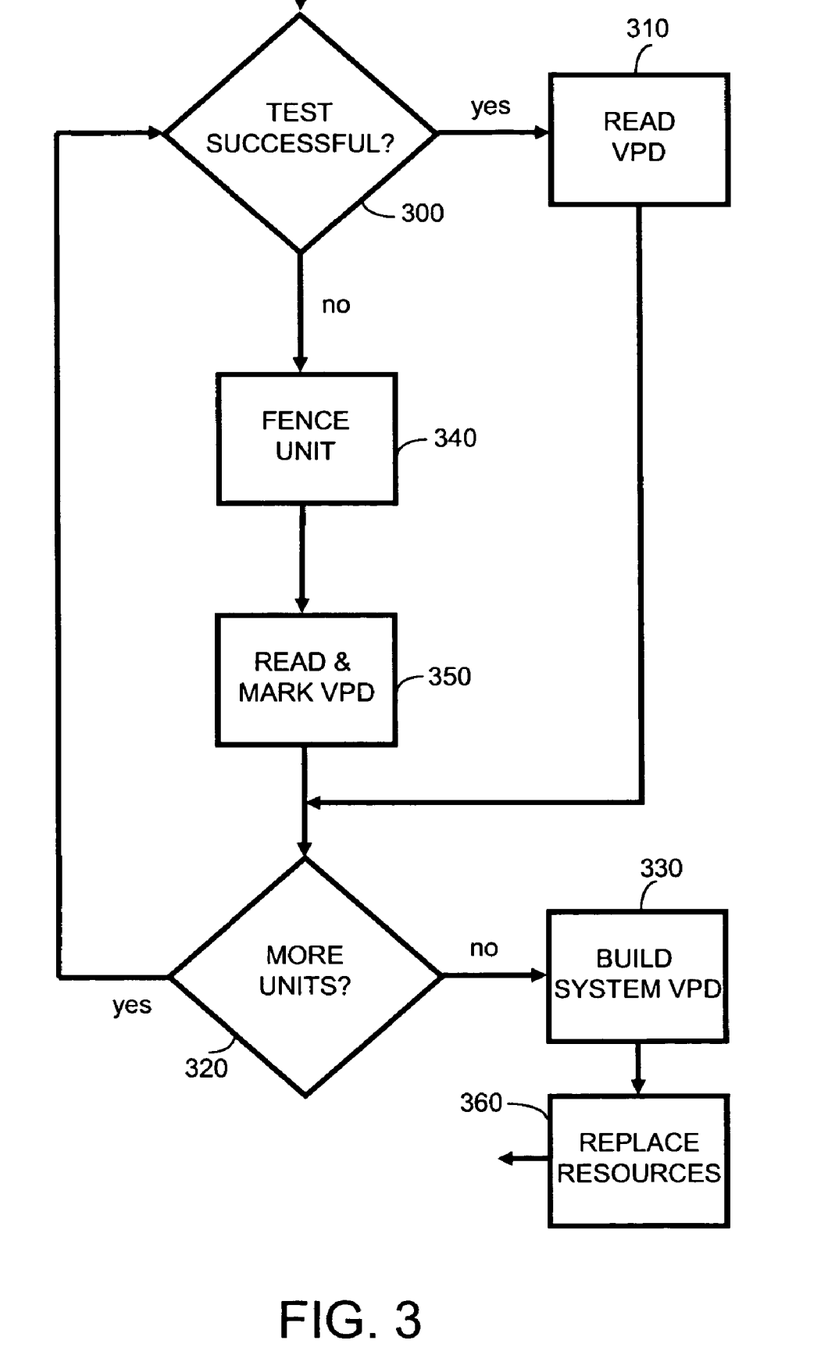
FIG. 3: Is a flow chart illustrating a method in accordance with the present invention.

FIG. 3 summarizes the steps for building the system VPD. In step 300 it will be determined if the test of a hardware unit was successful. If that is the case, then in step 310 the VPD of the hardware unit is read and stored in the main storage 130. Then in step 320 it is determined if there are more hardware units to be processed. If so, then step 300 is repeated. Otherwise the system VPD is built in step 330. If the test of the hardware unit was not successful, then in step 340 the functional part of the hardware unit is fenced from the system. Then in step 350 the VPD of the broken hardware unit is read and stored in the main storage 130, where it is marked as broken. Afterwards in step 320 it is determined if there are more hardware units to be processed. Otherwise the system VPD is built in step 330.

After the system VPD was built, then in step 360 dormant resources are enabled until all the resources of broken hardware units marked as enabled in the system VPD are replaced by these dormant resources or no more dormant resources that can be enabled are available. Then all the resources that are marked as enabled in the system VPD are marked as disabled when their VPD is marked as broken. This ensures that all the enabled resources belong to hardware units that are not broken.

In one embodiment of the invention the VPD of a hardware unit contains fence information that defines the actions to be performed by the service processor 131 when it fences the hardware unit from the system. Then the fencing of a hardware unit in step 340 is performed after the reading of the VPD in step 350.

The broken processor book 134 can be replaced during a service operation. A field engineer triggers the logical removal of the processor book 134 from the computer 110 configuration on the hardware console 120. The broken processor book 134 will then be removed physically from the computer 110 by unplugging it. Then the replacement part will be plugged in the computer 110 instead. In a final step the replacement part will be logically added to the computer 110 configuration. This step is again triggered by the field engineer on the hardware console 120.

The entire replacement procedure of the broken processor book 134 can be performed concurrently to the normal operation phase of the computer 110. When the processor book 134 is logically removed from the system configuration, then its VPD is removed from the system VPD. When the replacement part for the processor book 134 is logically added to the system configuration, then it is tested as during the power-on phase. When all the tests were successful, then its VPD will be read and added to the system configuration. Otherwise the replacement part will be fenced from the computer 110 as well.

The copy of its enablement definition data in the main storage 130 is then modified by the service processor 131 based on the grade of the resource compensation by the dormant resources in step 360 and added to the system VPD. If all the enabled resources of the broken processor book were replaced by dormant resources, then all the resources of the replacement part become dormant resources. Otherwise the number of resources that will be enabled is given by the number of resources of the broken processor book 134 for which no dormant resource were left for a replacement. The remaining resources of the replacement part that were not enabled become dormant resources during the normal operation phase.

Once the system VPD was updated, the service processor will initialise the newly enabled resources; e.g., for new CPs and SAPs it will perform a partial IML on these processors. Then it will inform the system firmware about the configuration change, which will then integrate the new resources. If a running instance of an operating system is able to detect and add the new resources, it can use them immediately. Otherwise it will use them in the next IPL.

For example, a capacity virtualizer (implemented in hardware, software/firmware, or both) as described in the U.S. patent application 2003/0120914 can make use of new resources immediately; e.g. for workload balancing. An example for such a capacity virtualizer is the LPAR (Logical PARtitioning) hypervisor of the IBM zSeries 990. It works as a logical function that splits up the physical resources into multiple sets of virtual resources comprising a virtual computer.

In the next power-on phase of the computer 110 the system VPD in the main storage 130 is lost as the main storage is either cleared by hardware (because the power connection was disabled) or it is cleared by the service processor 131 during the power-on phase. If the replacement part for the broken hardware unit 134 passes the test in step 300 then its VPD is integrated in the system VPD, especially its enablement definition data is used to enable its resources. No dormant resources from the other processor books 135, 136, 137 will be enabled to replace resources of the replacement part.

The replacement of a broken hardware unit can also be performed when the computer 110 is not connected to the power network. Then no logical add/remove steps for the system configuration have to be used. The invention is not limited to the power-on phase of a computer. It can also be used during the normal operation of a computer system. Various other methods to detect a broken hardware unit are possible. There is also no requirement for a service processor: Its tasks can be fulfilled by system firmware executed on one or more of the processors of a computer system for example.

A dedicated SAP is not needed for the invention. However, besides a differentiation of a processor in SAPs and CPs, various other differentiations in the enablement definition data are possible. For example, in the IBM zSeries eServer 990 a processor can also be used as an IFL (Integrated Facility for Linux), an ICF (Integrated Coupling Facility), and a zAAP (zSeries Application Assist Processor).

If the capacity of a hardware unit is adjustable not just by enabling or disabling physical resources at a level of physical granularity, but also at a level of logical granularity, then the present invention can be used as well. An example for such a scenario is the reduction of the processor performance by system firmware that allocates processor capacity permanently by continuously executing program code concurrent to the operating system running on the processor. In this case the information required to adjust the logical level can be contained in the enablement definition data and taken in consideration as well.

The VPD can be stored in any kind of storage device of the computer system. It can be stored at the time of the manufacturing of the hardware. However, it is also possible to transmit the VPD to the computer system via a telephone line, via a LAN, or other telecommunication means, when the computer is already installed at the customer site. Further, it is also possible to use the same storage for both the VPD and the ECID. Various symmetric and asymmetric encryption methods can be used for the VPD, e.g. the DES method and the RSA method. Also various methods for the encoding of the VPD with the ECID are possible, including not using the ECID at all.

This present invention can be realized in hardware, software, or a combination of hardware and software. It is preferably implemented as software, a sequence of machine-readable instructions, especially as so-called firmware executing on one or more hardware machines that controls and monitors these hardware machines and is often used to implement well-defined interfaces to the hardware, which other programs (especially operating systems) can use.

While a particular embodiment has been shown and described, various modifications of the present invention will be apparent to those skilled in the art.

The invention claimed is:

1. A method for reconfiguring functional capabilities in a data processing system (110) with dormant resources, comprising the steps of:
   detecting during power-on of said data processing system whether a hardware unit (134) is broken;
   reading (350) configuration data (147) from a non-broken part (non-functional part 141) of said broken hardware unit, said configuration data specifying the functional capabilities of said broken hardware unit;
   analysing the configuration data of all hardware units (134, 135, 136, 137) of said data processing system to identify dormant resources that are equivalent to the functional capabilities of said broken hardware unit; and
   enabling the identified dormant resources of said data processing system to replace (360) at least some of the functional capabilities of said broken hardware unit.

2. The method of claim 1, wherein the broken part (140) of said broken hardware unit is fenced (340) from said data processing system when a malfunction is detected (300).

3. The method of claims 1, wherein the configuration data for multiple hardware units (134, 135, 136, 137) is encoded with an unchangeable identifier (144) stored in respective hardware units, the method comprising the additional steps of:
   reading a copy (148) of said unique identifier; and
   decoding said configuration data of respective hardware units with said copy of said unique hardware identifier.

4. The method of claim 2, wherein the configuration data for multiple hardware units (134, 135, 136, 137) is encoded with an unchangeable identifier (144) stored in respective hardware units, the method comprising the additional steps of:
   reading a copy (148) of said unique identifier; and
   decoding said configuration data of respective hardware units with said copy of said unique hardware identifier.

5. The method of claim 1, wherein the read out configuration data is marked invalid after a preset time has elapsed since a malfunction of said broken hardware unit was detected.

6. The method of claim 1, comprising the further steps of:
   exchanging said broken hardware unit during the normal operation of said data processing system;
   analysing which functional capabilities of said broken hardware unit could not be replaced without the exchanged hardware unit and are missing;
   enabling only the missing functional capabilities of said exchanged hardware unit; and
   configuring the remaining functional capabilities of said exchanged hardware unit as dormant resources.

7. The method of claim 6, wherein all the functional capabilities of said exchanged hardware unit are enabled at the next power-on of said data processing system in accordance with the configuration data of said exchanged hardware unit.

8. A computer program loadable into the internal memory (130) of a digital computer system (110) and comprising software code run on said computer with portions for performing:
   detecting during power-on of said data processing system whether a hardware unit (134) is broken:
   reading (350) configuration data (147) from a non-broken part (non-functional part (141) of a broken hardware unit, said configuration data specifying the functional capabilities of said broken hardware unit;
   analysing the configuration data of multiple hardware units (134, 135, 136, 137) of said data processing system to identify dormant resources that are equivalent to the functional capabilities of said broken hardware unit; and
   enabling the identified dormant resources of said data processing system to replace (360) at least some of the functional capabilities of said broken hardware unit.

9. The computer program of claim 8, wherein the broken part (140) of said broken hardware unit is fenced (340) from said data processing system when a malfunction is detected (300).

10. The computer program of claim 8, wherein the configuration data for multiple hardware units (134, 135, 136, 137) is encoded with an unchangeable identifier (144) stored in respective hardware units, the method comprising the additional steps of:
   reading a copy (148) of said unique identifier; and
   decoding said configuration data of respective hardware units with said copy of said unique hardware identifier.

11. The computer program of claim 9, wherein the configuration data for multiple hardware units (134, 135, 136, 137) is encoded with an unchangeable identifier (144) stored in respective hardware units, the method comprising the additional steps of:

reading a copy (148) of said unique identifier; and decoding said configuration data of respective hardware units with said copy of said unique hardware identifier.

12. The computer program of claim 8, wherein the read out configuration data is marked invalid after a preset time has elapsed since a malfunction of said broken hardware unit was detected.

13. The computer program of claim 8, further comprising:

exchanging said broken hardware unit during the normal operation of said data processing system;

analysing which functional capabilities of said broken hardware unit could not be replaced without the exchanged hardware unit and are missing;

enabling only the missing functional capabilities of said exchanged hardware unit; and configuring the remaining functional capabilities of said exchanged hardware unit as dormant resources.

14. A data processing system (110) comprising:

a means for detecting during power-on of said data processing system whether a hardware unit (134) is broken;

a means for reading (350) configuration data (147) from a non-broken part (non-functional part 141) of a broken hardware unit, said configuration data specifying the functional capabilities of said broken hardware unit;

a means for analysing the configuration data of multiple hardware units (134, 135, 136, 137) of said data processing system to identify dormant resources that are equivalent to the functional capabilities of said broken hardware unit; and a means for enabling the identified dormant resources of said data processing system to replace (360) at least some of the functional capabilities of said broken hardware unit.

15. The data processing system (110) of claim 14, wherein the broken part (140) of said broken hardware unit is fenced (340) from said data processing system when a malfunction is detected (300).

16. The data processing system (110) of claim 14, wherein the configuration data of multiple hardware units (134, 135, 136, 137) is encoded with an unchangeable identifier (144) stored in respective hardware units, and further comprises:

a means for reading a copy (148) of said unique identifier; and a means for decoding said configuration data of respective hardware units with said copy of said unique hardware identifier.

17. The data processing system of claim 14, wherein the configuration data for multiple hardware units (134, 135, 136, 137) is stored in a first non-volatile memory (145) of the non-functional part (141) of respective hardware units and encoded with a unique chip identifier (144) of a chip (142) from the functional part (140) of respective hardware units, and said non-functional part of respective hardware units contain a copy (148) of said unique chip identifier in a second non-volatile memory (146).

18. The data processing system of claim 15, wherein the configuration data for multiple hardware units (134, 135, 136, 137) is stored in a first non-volatile memory (145) of the non-functional part (141) of respective hardware units and encoded with a unique chip identifier (144) of a chip (142) from the functional part (140) of respective hardware units, and said non-functional part of respective hardware units contain a copy (148) of said unique chip identifier in a second non-volatile memory (146).

19. The data processing system of claim 14, wherein the means for analyzing comprises a service processor (131).

20. The data processing system of claim 14, further comprising a system firmware capacity virtualizer.

\* \* \* \* \*